United States Patent Office 3,359,784
Patented Dec. 26, 1967

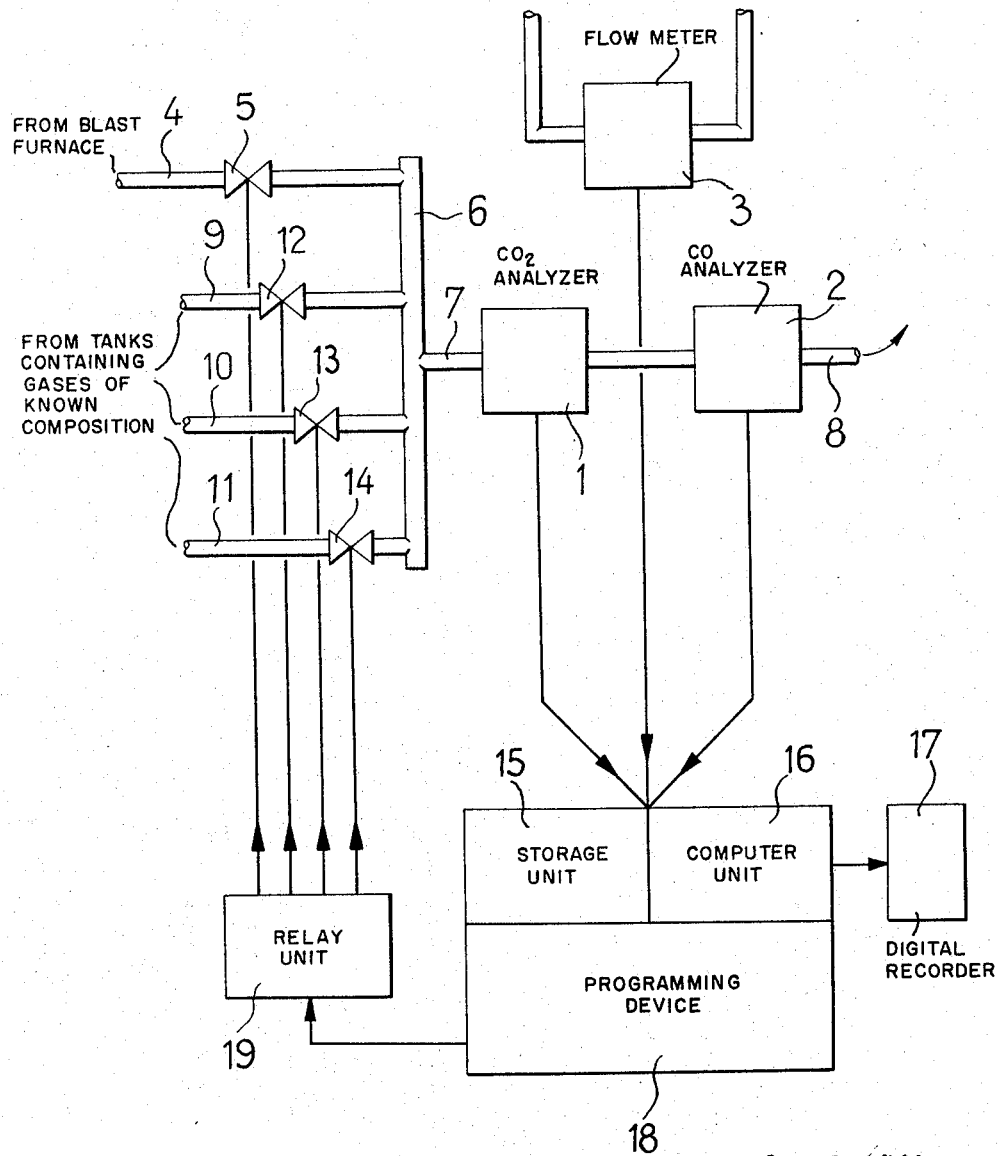

3,359,784
METHODS OF CONTROL OF INDUSTRIAL PROCESSES BY CONTINUOUS ANALYSIS OF A GASEOUS MIXTURE HAVING A VARIABLE COMPOSITION
Daniel Jorre, Scy-Bas, and Claude Staib, Metz-Tlantueres, France, assignors to Institut de Recherches de la Sidérurgie Francaise, Saint Germain-en-Laye, France, a professional institution of France
Filed Aug. 11, 1964, Ser. No. 388,815
Claims priority, application France Aug. 28, 1963, 945,915
7 Claims. (Cl. 73—23)

The present invention relates to the control of industrial processes, the monitoring and operation of which are carried out by analyzing a mixture of gases in continuous manner and in which the processing of the analytical data is also effected in continuous manner by means of a digital computer of the type known as a "data processor."

It frequently occurs that, over long periods of operation, gas analyzing devices are subject to drift processes or variations in gauging or calibration. And when it is required to control industrial processes such as, for example, the reduction of ore in a blast furnace, in which the measurable effects of an intervening operation performed as a result of the detection of an anomaly are spread out over periods of several hours, it will be understood that these variations in gauging of analyyers can have cumulative effects of a far-reaching nature, even to the extent of losing all the advantage of automation of the industrial plant considered.

It is therefore the main object of this invention to provide for a method for overcoming this disadvantage.

With the above object in view the invention is concerned with improvements in the method of control of industrial processes in which a digital computer of the "data processor" type is employed and a mixture of gases is continuously analyzed by means of gas-analyzing devices, the gauging of which does not have sufficient stability, these improvements comprising the following steps: the analyzing process is interrupted periodically and standard gases having known compositions are introduced in said analyzing devices, the corresponding output values which are delivered by the analyzing devices are recorded in the computer, and the values thus recorded are employed as points of gauging of the recording devices for a period of analysis which is comprised between two of the gauging thus effected.

The gauging and analyzing cycle which is thus carried into effect may be controlled automatically by the computer according to a pre-established program which is stored in the computer itself. The gauging points thus obtained may be converted by the computer into a gauging curve according to a pre-established interpolation and extrapolation program.

The results of a gauging may be utilized by the computer for the purpose of determining the analyses during the period of analysis which immediately follows said gauging.

The results of a gauging may also be utilized by the computer for correcting the analyses performed during the corresponding period of analysis as a function of the drift observed with respect to the previous gauging according to a pre-established interpolation programme.

In order that a clear understanding of the invention may be gained, one example will now be described, reference being made to the single figure of the accompanying drawings which represents diagrammatically a device for the continuous determination of the quantities of oxygen and of carbon which are evacuated in the form of CO and $CO_2$ in the gas at the top of a blast furnace.

The data which are necessary for the determination of these quantities are derived from a $CO_2$ analyzer which is designated by the reference 1, a CO analyzer which is designated by the reference 2 and a flow meter 3.

A small stream of gas which is derived from the blast furnace top is directed to the analyzers 1 and 2 via a conduit 4 in which is placed an electrovalve 5 and via a collector 6 which opens into the tube 7 through which the analyzers are supplied. The gases which are analyzed are then discharged to the exterior through a tube 8.

Three conduits 9, 10, 11 which terminate in the collector 6 and which are fitted with electrovalves 12, 13, 14 are connected to tanks (which have not been shown in the drawings) for containing gases having known compositions.

The signals which are delivered by the analyzers 1 and 2 and by the flow meter 3 are processed in a data processor which consists of a storage unit 15, a computer unit 16 to which is connected a digital recorder 17 and a programming device 18 which controls the operations involving the recording and processing of data at 15 and 16 and the cycle of opening and closing of the valves 5, 12, 13 and 14 through the intermediary of a unit 19 composed of relays.

If the flow rate (in $Nm.^3$/min.) of the gas which passes out of the blast-furnace top is designated by the reference D and the concentrations of CO and $CO_2$ contained in this gas (in $Nm.^3$ per $Nm.^3$ of gas) are designated by the symbols $\alpha$ and $\beta$, the normal volume Q in $Nm.^3$ of oxygen which is discharged in the same unit of time from the blast furnace top is given by the relation:

$$Q = D(0.5\alpha + \beta)$$

The quantity C in kgs./min., of carbon discharged from the top is given by the relation:

$$C = \frac{12}{22.4} D(\alpha + \beta)$$

that is:

$$C = 0.536 D(\alpha + \beta)$$

The device which is described in the present example has the intended function (among others) of gauging the devices 1 and 2 at hourly intervals, then of storing at 15 at two-minute intervals the values of the signals which are delivered by the devices 1, 2 and 3 and of calculating, by making use of the gauging which has been established, the corresponding values of $(\alpha, \beta, Q, C)$ and of expressing them numerically by means of the digital recorder 17. Moreover, after a measuring period of one hour, the device determines, at the same time as a further gauging of the analyzers, the variations in gauging which these devices have incurred since the previous hour and expresses numerically at 17, on the basis of the elements which are stored at 15, the mean values of $(\alpha, \beta, Q, C)$ which correspond to each third of the previous period, after having corrected said values on the basis of said variations in gauging.

The gauging of the devices 1 and 2 is carried into effect when, after one hour of measurements, the programming device 18 transmits a pulse at 19, thereby initiating a sequence of controlled operations at 19: closure of the valve 5, opening of the valve 12 for a period of two minutes during which a gas stream of known composition $(\alpha_1, \beta_1)$ flows through the analyzers 1 and 2; followed by closure of the valve 12 and opening of the valve 13 which results in the passage of a second gas stream of known composition $(\alpha_2, \beta_2)$ and, two minutes afterwards, the closure of the valve 13 followed by the opening of the valve 14, which initiates the flow through the analyzers of a third gas stream of known composition ($\alpha_3, \beta_3$) and, two minutes later, the said valve 14 is closed and the valve 5 is opened for a further period of measurements of one hour.

It will be apparent that, during the six-minutes period in which the three samples of gas having known compositions flow through the analyzers, the programming device 18 interrupts the utilization of the signals which are derived from the flow meter 3.

Moreover, during this period which is referred-to as the "gauging period," just before the closure of the valve 12, the signals having amplitudes $a_1$ and $b_1$ which are delivered by the analyzers 1 and 2 are stored at 15. The same "storage" operation is repeated two minutes afterwards for those signals having amplitudes $a_2$ and $b_2$ which correspond to the known concentrations $\alpha_2$ and $\beta_2$ of CO and $CO_2$ contained in the second gaseous mixture, then, two minutes later, for the signals $a_3$ and $b_3$ which are representative of $\alpha_3$ and $\beta_3$.

During the measuring periods, the gas stream whose concentrations $\alpha$ and $\beta$ of CO and $CO_2$ are to be determined flow through the analysers 1 and 2. The signals having amplitudes $a$ and $b$ which are delivered by said analyzers are stored at two-minute intervals at 15 at the same time as the signals which are derived from the flow meter 3 and are then processed at 16 on the basis of the gauging values represented by the signals $a_1, a_2, a_3, b_1, b_2, b_3$ and the concentration $\alpha_1, \alpha_2, \alpha_3, \beta_1, \beta_2, \beta_3$ which these signals represent respectively.

In the example which is chosen, the concentrations $\alpha$ and $\beta$ are determined from these gauging values and from $a$ and $b$ by the values taken by the expressions:

(I)
$$\alpha = \alpha_1 \frac{(a-a_2)(a-a_3)}{(a_1-a_2)(a_1-a_3)} + \alpha_2 \frac{(a-a_1)(a-a_3)}{(a_2-a_1)(a_2-a_3)} + \alpha_3 \frac{(a-a_1)(a-a_2)}{(a_3-a_1)(a_3-a_2)}$$

(II)
$$\beta = \beta_1 \frac{(b-b_2)(b-b_3)}{(b_1-b_2)(b_1-b_3)} + \beta_2 \frac{(b-b_1)(b-b_3)}{(b_2-b_1)(b_2-b_3)} + \beta_3 \frac{(b-b_1)(b-b_2)}{(b_3-b_1)(b_3-b_2)}$$

which are none other than applications to the present case of the interpolation (or extrapolation) formula of Lagrange.

It will of course be understood that the values $\alpha_1$, $\alpha_2$ . . . etc., of the different contents of standard gases are chosen in such manner as to be placed substantially at the centre and at the ends of the region in which the values of the contents $\alpha$ and $\beta$ of the analyzed gases occur.

On the basis of the values of $\alpha$ and $\beta$ which are thus calculated as well as on the basis of the signals which are representative of D, the computer 16 works out the values of Q and C from the formulae which have been given above. The results of all these calculations are immediately transmitted to the digital recorder-indicator 17.

As has been stated earlier, the values of the signals which are derived from the analyzers and from the flow meter and which are utilized every two minutes are stored in the memory or storage stystem and, after the following gauging, are employed for the purpose of working out the mean values of ($\alpha, \beta, Q, C$) which correspond to the first ten measurements, to the ten following measurements and to the last ten measurements, taking into account any possible variations in the gauging parameters since the previous gauging.

These corrected mean values, the utilization of which will be explained below, are calculated by means of the different expressions indicated above in which $a$ and $b$ are replaced by their mean values whereas the values $a_i$ and $b_i$ of the gauging signals are replaced by the values $$(a_i + \Delta a_i), (b_i + \Delta b_i)$$

Each of the values $\Delta a_i$ and $\Delta b_i$ is determined from new values $a'_i, b'_i$ of the gauging signals by means of the relation:

$$\Delta a_i = (a'_i - a_i)\frac{n}{30} \text{ or } \Delta b_i = (b'_i - b_i)\frac{n}{30}$$

wherein $n$ is the mean range (that is to say 5 or 15 or 25) occupied in the measuring period by the elements ($\alpha, \beta, Q, C$), the mean value of which it is required to express.

These different operations are carried out in the computer 16 on the basis of elements which are stored at 15 and the device delivers at 17 during each new measuring period three groups of corrected mean values ($\alpha, \beta, Q, C$), as has just been shown.

The groups of values referred-to are stored at 15 and are subsequently utilized for the purpose of drawing up the materials and power balance sheets which make it possible to describe the "state" of the blast furnace and, by comparison with balance sheets drawn up in the previous hours, makes it possible to foresee any tendency to a particular state of equilibrium and to take the necessary steps to ensure that such a state in fact corresponds to a pre-established state.

The balance sheets referred-to above correspond to periods separated by twenty-minute intervals and can be known only after a slight delay but as the development of processes in a blast furnace is very slow, there is no need to draw up such balance sheets very frequently and it is accordingly not a matter of very great importance if the "state" of the blast furnace is described by parameters which are measured one half hour or even one hour earlier.

The gas analyzers 1 and 2 are of the so-called "infrared radiation absorption" type wherein the gaseous mixture which is admitted at 7 and discharged at 8 (to the atmosphere) flows within each analyzer through a chamber known as the analyzing chamber, there being sent through said chamber an infrared light beam, the absorption of which is measured.

In point of fact, it is known that said absorption depends only on the number of absorbent molecules (molecules of the compound to be determined) which are encountered by the light beam or, in other words, said absorption is representative not of the concentration $\alpha$ alone of the compound analyzed, but of the product $$\alpha \frac{P}{T}$$

P and T being respectively the absolute pressure and temperature of said compound in the analyzing chamber.

The standard gases, then the gas stream to be analyzed, are introduced at 7 with a very slight overpressure which is constant with respect to atmospheric pressure, then discharged at 8 to free air. Furthermore, the temperature conditions within the analyzing chamber in the case of the standard gases and in the case of the gas stream to be analyzed are identical.

It can therefore be seen that the operation is carried out in such a manner that the variations in atmospheric conditions have an identical influence on the standard gases and on the gaseous mixture which is circulated within each analyzer, thereby eliminating a number of requirements in connection with the measurement of the ratio P/T or in connection with the regulation thereof in order to ensure that said variations in atmospheric conditions are not liable to impair the results.

In order to obtain an appreciable degree of inaccuracy of balance sheets which are drawn up on the basis of corrected mean values, it would be necessary that either the devices or the atmosphere which surrounds said devices be subjected to ample short-time perturbations, the evolution of which between two measurements (namely one hour) would not be linear (with respect to time) even in an approximate manner, which is practically impossible. That could in any case be detected immediately as a result of the abnormal variations of those values $\alpha$ and $\beta$ which are indicated at two-minute intervals by the recorder 17.

It will be readily understood that this example is not given in any limiting sense and that it would be possible to devise a large number of improvements and detail modifications and similarly to contemplate the use of equivalent means without thereby departing from the scope or the spirit of the present invention.

What is claimed as new and desired to be secured by Letters Patent is:

1. A method of control of the character described comprising the steps of analyzing components of a test gas by means of gas analyzing devices; feeding the thus obtained test output values into a computer; periodically interrupting the analyzing process of said test gas and introducing standard gases of known components into said analyzing devices to obtain corresponding comparison output values; recording the obtained comparison output values in a computer; converting the recorded comparison output values by means of a pre-established interpolation and extrapolation program by the computer into a calibration curve for the gas analyzing devices; and correcting said thus obtained test output values of the analysis of said test gas during the period of analysis immediately following said calibration on the basis of said calibration curve.

2. A method of control as defined in claim 1, wherein the intervals of periodically interrupting the analysis of said test gas and of introducing standard gases into said analyzing devices are automatically controlled by the computer according to a pre-established program.

3. A method of control as defined in claim 1, wherein the periods of analyzing said test gas are considerably longer than the periods during which said analyzing process is interrupted and said gases of known composition are fed into said analyzing devices.

4. A method of control as defined in claim 3, wherein in each of said periods during which said analyzing process is interrupted three gases of known composition are introduced in successive short intervals into said analyzing devices.

5. A method of control as defined in claim 4, wherein said short intervals are about two minutes, and wherein each of said analyzing periods is about one hour.

6. A method of control as defined in claim 1, wherein a first plurality of calibration points are derived by introducing standard gases of known composition into said analyzing devices, wherein subsequently thereto the components of said test gas are analyzed during a predetermined time period by means of the analyzing devices, whereafter a second plurality of calibrating points is derived by introducing again said standard gases into said analyzing devices, and wherein the drift between said first and second calibrating points is determined and the results of analysis of said test gas during said predetermined time period is corrected by the computer as a function of said drift.

7. A method of control as defined in claim 6, wherein the time periods during which said standard gases are introduced into said analyzing devices are considerably shorter than said predetermined time period.

References Cited
UNITED STATES PATENTS

| | | | |
|---|---|---|---|
| 2,579,352 | 12/1951 | White | 73—23 |
| 3,070,988 | 1/1963 | Kapff et al. | 73—1 |
| 3,247,703 | 4/1966 | Burk | 73—23.1 |

OTHER REFERENCES

Fuller, "Gas Chromatography in Plant Streams," Instrument Society of America Journal, vol. 3, No. 11, November 1956, pp. 440–444.

RICHARD C. QUEISSER, *Primary Examiner.*

JAMES J. GILL, *Examiner.*

J. FISHER, C. I. McCLELLAND, *Assistant Examiners.*